(12) United States Patent
Ashikaga et al.

(10) Patent No.: US 6,661,593 B2
(45) Date of Patent: Dec. 9, 2003

(54) SERVO INFORMATION DETECTION METHOD AND DISK APPARATUS USING THE SAME

(75) Inventors: Hiroshi Ashikaga, Kawasaki (JP); Nobuyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 344 days.

(21) Appl. No.: 09/901,743

(22) Filed: Jul. 10, 2001

(65) Prior Publication Data
US 2002/0109929 A1 Aug. 15, 2002

(30) Foreign Application Priority Data
Feb. 14, 2001 (JP) .......................................... 2001-037648

(51) Int. Cl.$^7$ ................................................ G11B 5/09
(52) U.S. Cl. .......................................... 360/51; 360/53
(58) Field of Search .................. 360/51, 53; G11B 5/09

(56) References Cited

U.S. PATENT DOCUMENTS 6,498,695 B2 * 12/2002 Kosugi ......................... 360/48

* cited by examiner

*Primary Examiner*—David Hudspeth
*Assistant Examiner*—Dan I. Davidson
(74) *Attorney, Agent, or Firm*—Greer, Burns & Crain, Ltd.

(57) ABSTRACT

In a servo information detection method and disk apparatus of the present invention, it is determined whether a pattern of detection bits, detected from a vicinity of a servo sync mark of a disk, matches with a given comparison bit pattern. A pattern of tolerance bits is changed based on a location of the disk where the servo sync mark is detected, so that the matching between the detection bit pattern and the comparison bit pattern is performed based on the changed tolerance bit pattern.

18 Claims, 8 Drawing Sheets

(A) SERVO SYNC MARK PATTERN    `1011001`

(B) FRONT-END PATTERN PRECEDING SERVO SYNC MARK    `1010`

(C) TAIL-END PATTERN FOLLOWING SERVO SYNC MARK    `0001`

(D) COMPARISON BIT PATTERN    `1010` `1011001` `0001`

SERVO INFORMATION DETECTION METHOD AND DISK APPARATUS USING THE SAME

BACKGROUND OF THE INVENTION

1. Field of The Invention

The present invention generally relates to a servo information detection method and a disk apparatus using the same, and more particularly relates to a servo information detection method which detects servo information recorded at given intervals in a disk, as well as a disk apparatus using the servo information detection method.

2. Description of the Related Art

A description will be given of a magnetic disk drive with reference to FIG. 1A, FIG. 1B and FIG. 2.

Figure 1A:
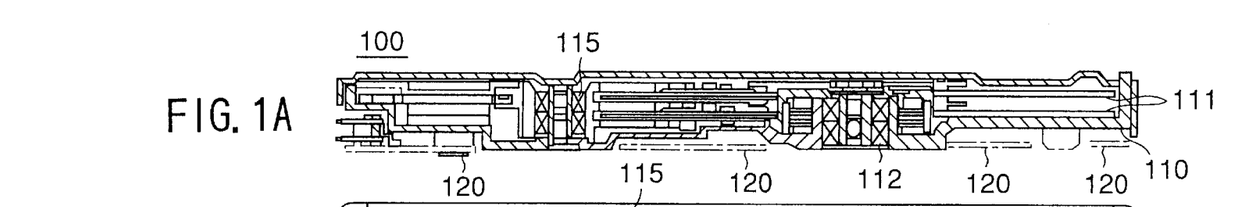
FIG. 1A and FIG. 1B are diagrams showing a magnetic disk drive.
Figure 1B:
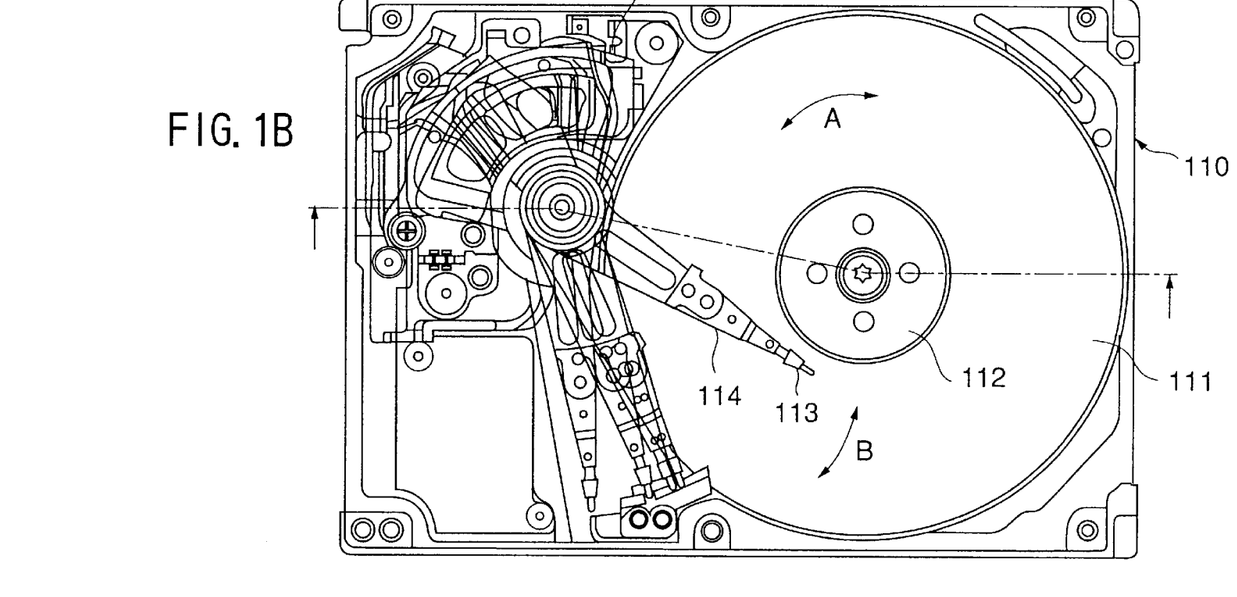

As shown in FIG. 1A and FIG. 1B, the magnetic disk drive 100 generally includes a disk enclosure (DE) 110 and a printed circuit board (PCB) 120. The magnetic disk drive 100 is, for example, a hard disk drive (HDD).

In the disk enclosure 110, a magnetic disk 111, a spindle motor (SPM) 112, an arm 114, and a voice coil motor (VCM) 115 are provided. In a case of the hard disk drive (HDD), a plurality of magnetic disks are rotated by a spindle motor at the same time. However, in the following description, such magnetic disks are collectively referred to as the magnetic disk 111, for the sake of convenience of description.

In the magnetic disk drive 100, the printed circuit board 120 supplies a drive signal to the spindle motor 112 so that the spindle motor 112 is driven to rotate the magnetic disk 111 around the central axis of the spindle motor at a constant velocity in a rotation direction indicated by the arrow A in FIG. 1B. The printed circuit board 120 supplies a drive signal to the voice coil motor 115 so that the voice coil motor 115 is driven to swing or rotate the arm 114 around the central axis of the voice coil motor in a rotation direction indicated by the arrow B in FIG. 1B. The magnetic head 113 is attached to the leading edge of the arm 114. By the swinging movement of the arm 114 in the direction B, the magnetic head 113 at the leading edge of the arm 114 is moved in a radial direction of the magnetic disk 111.

Figure 2:
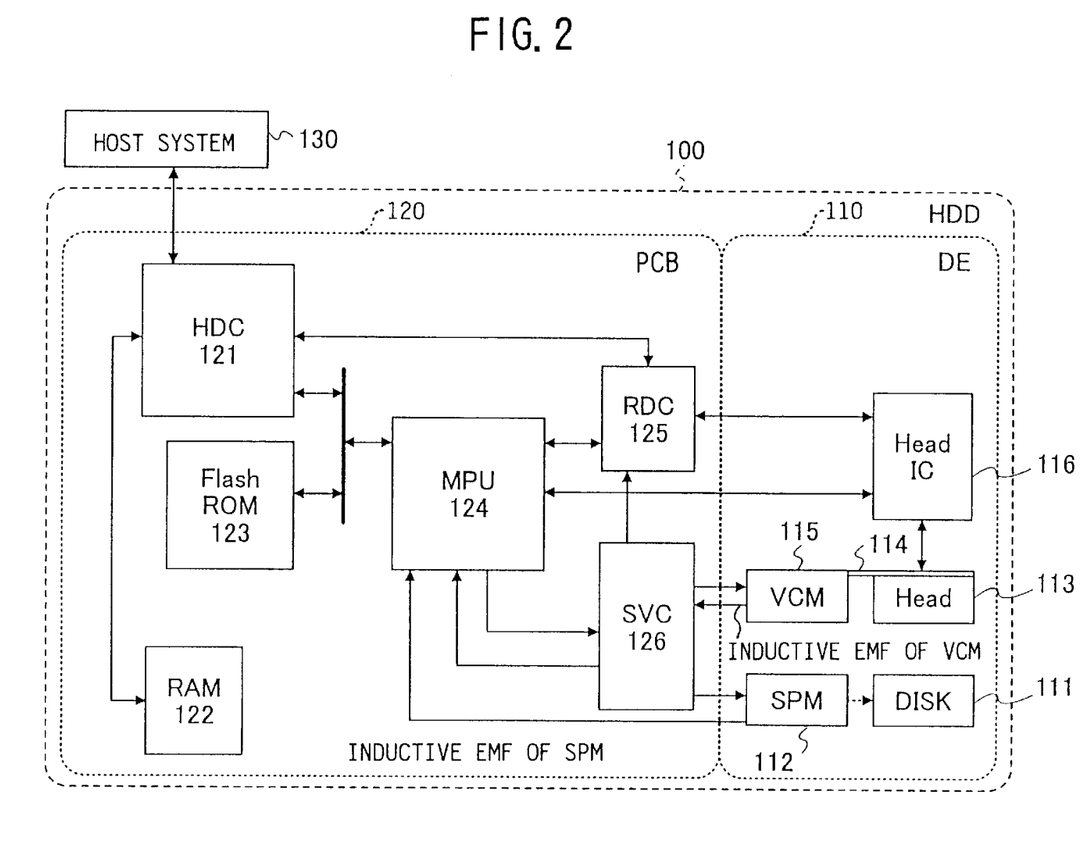
FIG. 2 is a block diagram of a control section of the magnetic disk drive.

As shown in FIG. 2, the disk enclosure (DE) 110 further includes a head controller (Head IC) 116. During a read operation, the head 113 electromagnetically generates a readout signal from the disk 111 and supplies the readout signal to the head controller 116. The head controller 116 amplifies the readout signal received from the head 113. The amplified readout signal from the head controller 116 is supplied to the printed circuit board 120. During a write operation, the head controller 116 amplifies a writing signal that is to be recorded in the disk 111, and supplies the amplified writing signal to the magnetic head 113.

As shown in FIG. 2, in the printed circuit board (PCB) 120, a hard disk controller (HDC) 121, a random access memory (RAM) 122, a flash read-only memory (Flash ROM) 123, a microprocessor unit (MPU) 124, a read channel (RDC) 125, a servo controller (SVC) 126, and linear acceleration sensors 127 and 128 are provided.

As described above, the head 113 generates a readout signal from the disk 111, and the readout signal from the head 113 is amplified by the head controller 116. The amplified readout signal, output by the head controller 116, is supplied to the hard disk controller (HDC) 121 through the read channel 125 in the printed circuit board (PCB) 120. The amplified readout signal is subjected to a decoding process at the HDC 121. The HDC 121 supplies the readout information, which is produced through the decoding process from the amplified readout signal, to an external host system 130.

Further, writing information is supplied from the host system 130 to the HDC 121. The writing information is subjected to an encoding process at the HDC 121. The HDC 121 supplies the encoded signal, which is produced through the encoding process from the writing information, to the head controller 116 of the disk enclosure (DE) 110 via the read channel 125. The encoded signal is amplified by the head controller 116. The head controller 116 supplies the amplified signal to the head 113, so that the writing information is electromagnetically recorded in the disk 111 by using the head 113.

Figure 3A:
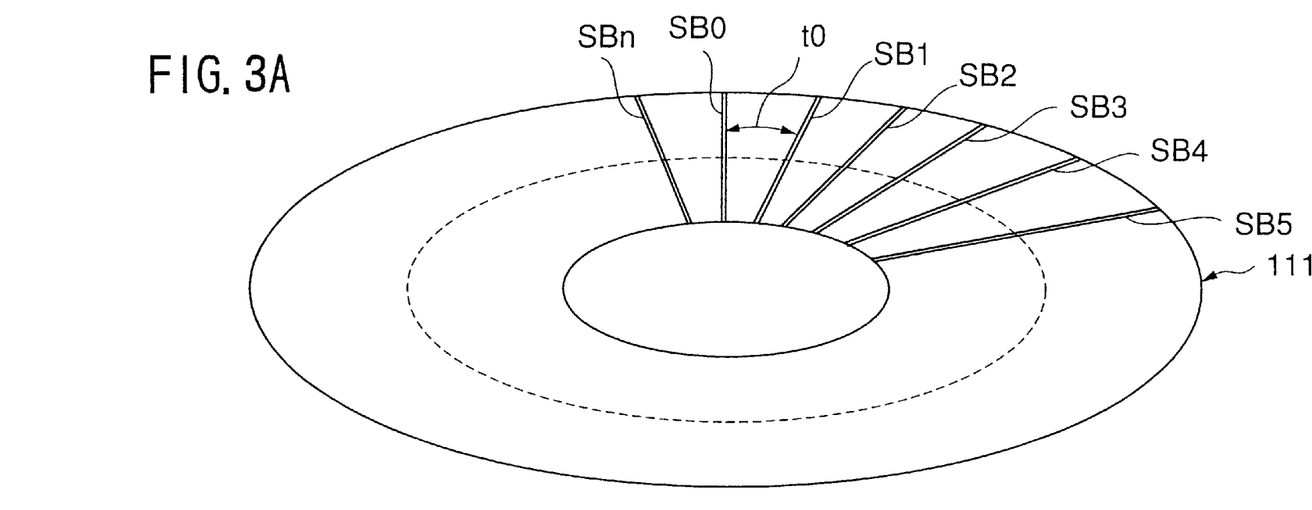
FIG. 3A and FIG. 3B are diagrams for explaining a format of servo information of a disk.
Figure 3B:
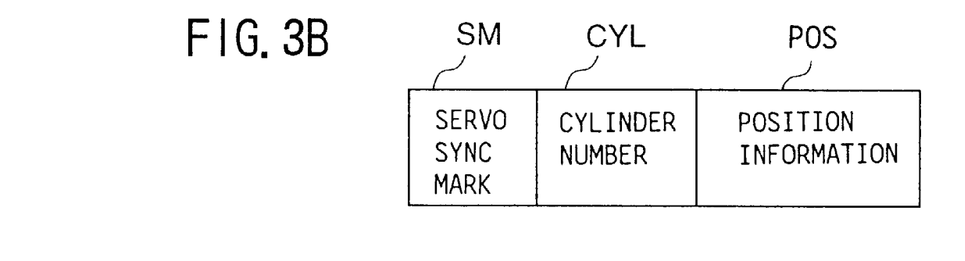

FIG. 3A and FIG. 3B show a format of servo information of the magnetic disk 111 that is used by the magnetic disk drive.

As shown in FIG. 3A, a sequence of servo information blocks SB0, SB1, . . . , SBn is recorded at given intervals "t0" in the magnetic disk 111. Normally, by using a servo track writer STW (not shown), the servo information blocks SB0, SB1, . . . , SBn are recorded, in advance, in the respective sectors of the magnetic disk 111.

As shown in FIG. 3B, each of the servo information blocks SB0, SB1, . . . , SBn is comprised of servo sync mark SM, cylinder number CYL, and position information POS. Generally, when all of the servo sync marks SM are detected from the disk 111, it is determined as detecting the sequence of servo information blocks SB0, SB1, . . . , SBn.

In a conventional disk apparatus, when the entire bit pattern of the servo sync marks SM, detected by the conventional disk apparatus from the magnetic disk 111, matches with a given comparison bit pattern, the presence of the servo sync mark SM in the detection bit pattern is detected. However, if a medium defect with respect to at least one bit among the bit pattern of the servo sync marks exists in the disk, the match does not occur and the absence of the servo sync mark in the detection bit pattern is detected. In the latter case, the conventional disk apparatus generates indication of an error that indicates which sector of the disk is a defective sector including the defect. That is, the conventional disk apparatus cannot correctly detect the presence of the servo sync mark in the detection bit pattern if the detection bit pattern contains a bit affected by an insignificant defect on the disk.

SUMMARY OF THE INVENTION

An object of the present invention is to provide an improved servo information detection method that accurately and reliably detects the servo information in the disk without being influenced by an insignificant defect on the disk.

Another object of the present invention is to provide a disk apparatus using an improved servo information detection method that accurately and reliably detects the servo information in the disk without being influenced by an insignificant defect on the disk.

The above-mentioned objects of the present invention are achieved by a servo information detection method for detecting a servo sync mark of a disk, the method comprising the steps of: determining whether a pattern of detection bits, detected from a vicinity of the servo sync mark of the disk, matches with a given comparison bit pattern; and changing a pattern of tolerance bits based on a location of the disk where the servo sync mark is detected, so that the matching between the detection bit pattern and the comparison bit pattern is performed based on the changed tolerance bit pattern.

The above-mentioned objects of the present invention are achieved by a disk apparatus in which a servo sync mark of a disk is detected, the disk apparatus comprising: a determination unit which determines whether a pattern of detection bits, detected from the servo sync mark of the disk, matches with a given comparison bit pattern; and a control unit which changes a pattern of tolerance bits based on a location of the disk where the servo sync mark is detected, so that the determination unit is allowed to perform the matching between the detection bit pattern and the comparison bit pattern based on the changed tolerance bit pattern.

The servo information detection method and the disk apparatus of one preferred embodiment of the present invention are effective in accurately and reliably detecting the servo information in the disk without being influenced by an insignificant defect on the disk. Even if a medium defect of the size of 1 bit or more is included in the detection bit pattern, the presence of the servo sync mark therein can be reliably detected without causing an error. It is possible to prevent the reduction of the amount of storage available to the disk due to the defective sector or the like.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of preferred embodiments of the present invention with reference to the accompanying drawings.

The servo information detection method and the disk apparatus of the present invention are embodied by utilizing the disk apparatus 100 shown in FIG. 2. That is, in one preferred embodiment of the servo information detection method and the disk apparatus of the present invention, the servo information (or the servo sync marks SM shown in FIG. 3) in the disk is detected by using the read channel (RDC) 125 of the printed circuit board 120 of the disk apparatus 100 of FIG. 2. The detection of the servo information in the disk is executed by the MPU 124 in accordance with a program recorded, in advance, in the ROM 123.

Figure 4:
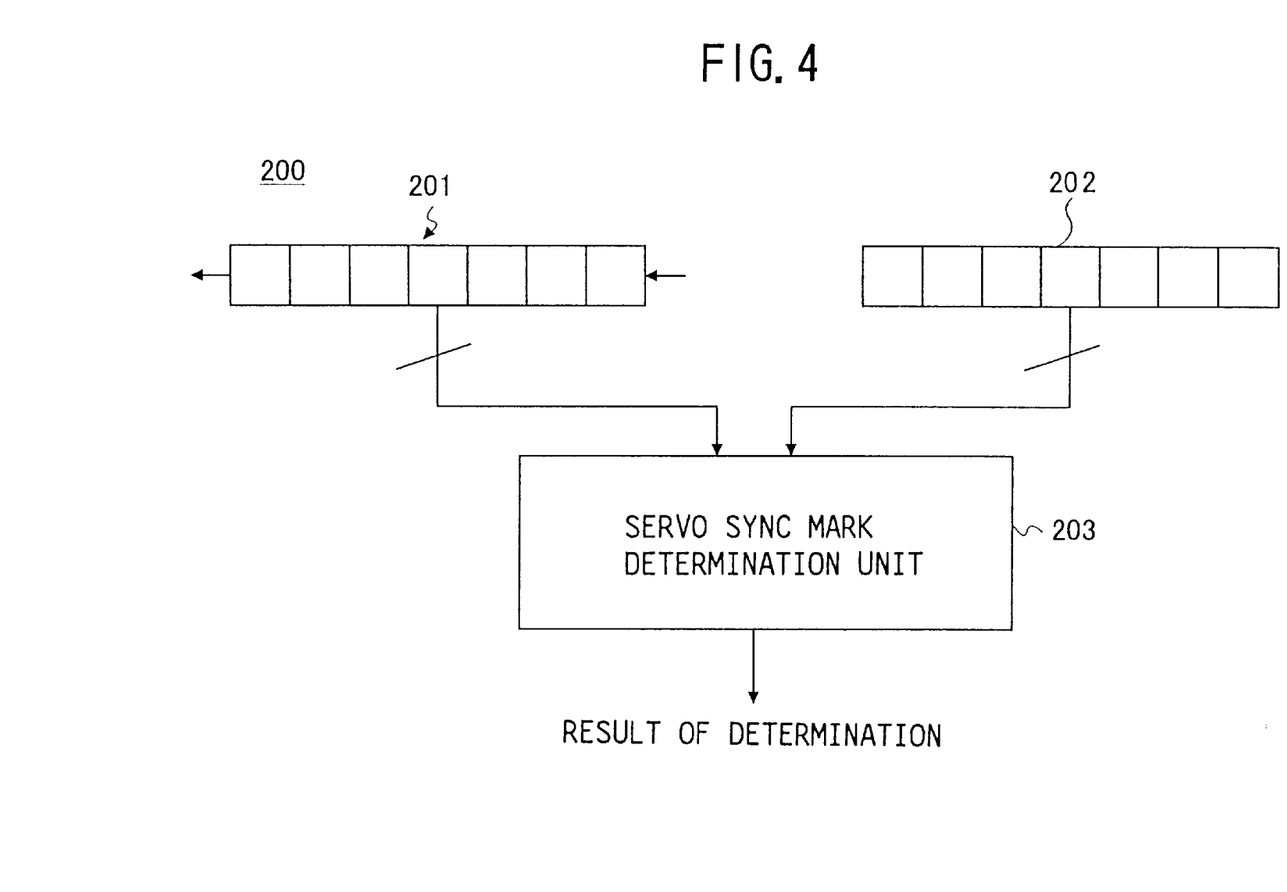
FIG. 4 is a block diagram of a servo sync mark determination processing unit in one preferred embodiment of the disk apparatus of the invention.

FIG. 4 shows a servo sync mark determination processing unit (SMDP) 200 in one preferred embodiment of the disk apparatus of the invention.

Suppose that the SMDP 200 of the present embodiment is configured such that the number of bits stored in each of the elements of the SMDP 200 is seven, for the sake of convenience of illustration.

As shown in FIG. 4, the SMDP 200 generally includes a detection bit shift register (DBSR) 201, a servo sync mark register (SMR) 202, and a servo sync mark determination unit (SMD) 203.

In the present embodiment, the DBSR 201 stores the latest bits of the bit pattern of servo sync marks which are detected. Every time one of a plurality of bits in the bit pattern of servo sync marks is newly detected, the detected bit is stored into the least significant bit (LSB) position of the DBSR 201 and the bit previously stored at the most significant bit (MSB) position of the DBSR 201 is discarded. The DBSR 201 always stores a predetermined number of the latest bits of the bit pattern of the detected servo sync marks. The SMR 202 stores a given comparison bit pattern for a servo sync mark.

In the present embodiment, the SMD 203 determines whether the detection bit pattern stored in the DBSR 201 matches with the comparison bit pattern stored in the SMR 202, on a bit-by-bit basis. As a result of the determination, the SMD 203 outputs a signal indicative of whether the presence of the servo sync mark SM in the detection bit pattern is detected. For example, when the presence of the servo sync mark in the detection bit pattern is detected, the SMD 203 outputs a high-level signal ("1") as the result of the determination. When the absence of the servo sync mark in the detection bit pattern is detected, the SMD 203 outputs a low-level signal ("0") as the result of the determination.

Next, the servo sync mark determination unit (SMD) 203 will be explained in detail.

Figure 5:
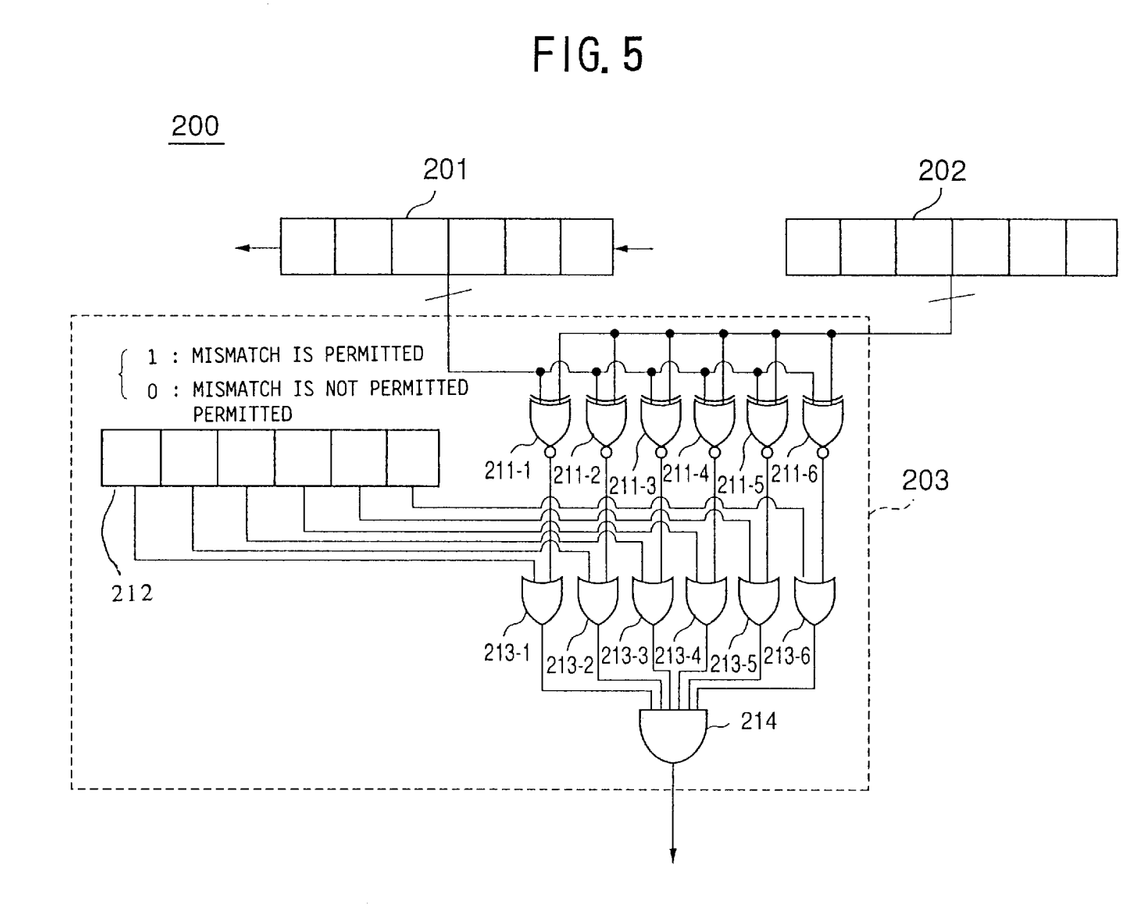
FIG. 5 is a circuit diagram of a servo sync mark determination processing unit in the disk apparatus of the present embodiment.

FIG. 5 is a circuit diagram of a servo sync mark determination processing unit (SMDP) 200 in one preferred embodiment of the disk apparatus of the invention.

Suppose that the SMDP 200 of the present embodiment is configured such that the number of bits stored in each of the elements of the SMDP 200 is six, for the sake of convenience of illustration.

As shown in FIG. 5, the SMD 203 generally includes six NOT-EXOR gates 211-1 through 211-6, a tolerance bit register (TBR) 212, six OR gates 213-1 through 213-6, and an AND gate 214. The bits of the detection bit pattern stored in the DBSR 201 are supplied to first inputs of the NOT-EXOR gates 211-1 through 211-6, and the bits of the comparison bit pattern stored in the SMR 202 are supplied to second inputs of the NOT-EXOR gates 211-1 through 211-6.

Each of the NOT-EXOR gates 211-1 through 211-6 outputs a result of the NOT-EXOR logic based on the two input bits (the detection bit pattern and the comparison bit pattern) to a corresponding one of the OR gates 213-1 through 213-6. Namely, the bits, output by the NOT-EXOR gates 211-1 through 211-6, are supplied to first inputs of the OR gates 213-1 through 213-6. When the match between the detection bit pattern and the comparison bit pattern occurs, the corresponding one of the NOT-EXOR gates 211-1 through 211-6 outputs a high-level signal ("1") as the result of the NOT-EXOR logic. When the match between the detection bit pattern and the comparison bit pattern does not occur, the corresponding one of the NOT-EXOR gates 211-1 through 211-6 outputs a low-level signal ("0") as the result of the NOT-EXOR logic.

In the SMD 203 of the present embodiment, the tolerance bit register (TBR) 212 stores a pattern of tolerance bits. The bits of the tolerance bit pattern stored in the TBR 212 are supplied to second inputs of the OR gates 213-1 through 213-6. In the TBR 212, when the mismatch at one of the bits in the tolerance bit pattern is permitted, the corresponding bit of the tolerance bit pattern is set to "1", and when the mismatch at one of the bits in the tolerance bit pattern is not permitted, the corresponding bit of the tolerance bit pattern is set to "0".

Each of the OR gates 213-1 through 213-6 outputs a result of the OR logic based on the two input bits (the match/mismatch bit value and the tolerance bit value), to the AND gate 214. Namely, the bits output by the OR gates 213-1 through 213-6 are supplied to inputs of the AND gate 214. The AND gate 214 outputs a result of the AND logic based on the plurality of the input bits. As described above, if the presence of the servo sync mark in the detection bit pattern is detected, the AND gate 214 outputs a high-level signal ("1") as the result of the determination. If the absence of the servo sync mark in the detection bit pattern is detected, the AND gate 214 outputs a low-level signal ("0") as the result of the determination.

Figure 6:
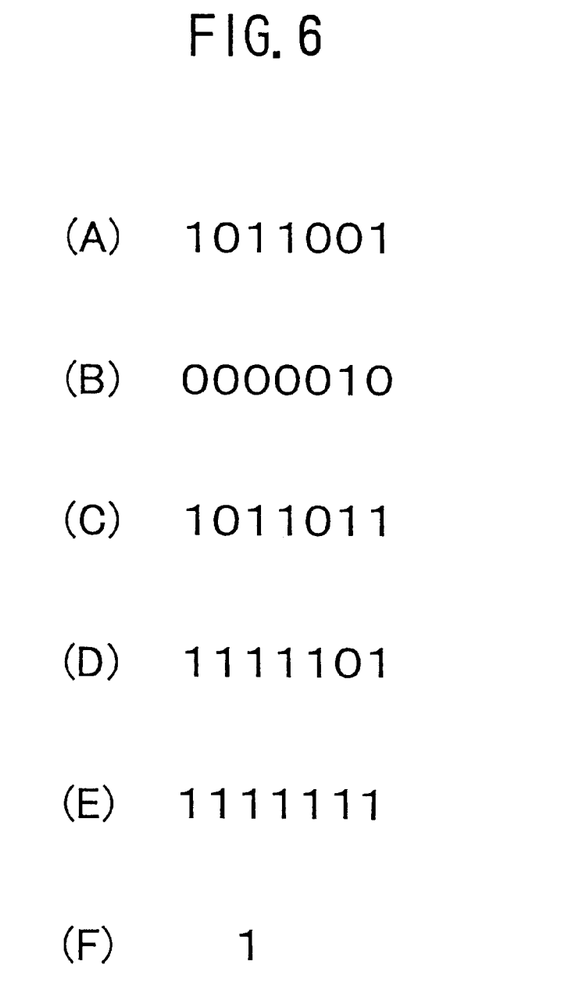
FIG. 6 is a diagram for explaining detection of servo sync marks that is performed by a servo sync mark determination processing unit in the disk apparatus of the present embodiment.

FIG. 6 is a diagram for explaining detection of servo sync marks that is performed by a servo sync mark determination processing unit (SMDP) 200 in the disk apparatus of the present embodiment.

Suppose that the SMDP 200 of the present embodiment is configured such that the number of bits stored in each of the elements of the SMDP 200 is seven, for the sake of convenience of illustration. Similar to the previous embodiment of FIG. 5, the SMD 203 of the present embodiment generally includes a plurality of NOT-EXOR gates 211, a tolerance bit register (TBR) 212, a plurality of OR gates 213, and an AND gate 214.

In FIG. 6, (A) indicates the bit pattern stored in the servo sync mark register 202, (B) indicates the bit pattern stored in the tolerance bit register 212, (C) indicates the bit pattern stored in the detection bit shift register 201, (D) indicates the bit pattern output by the NOT-EXOR gates 211, (E) indicates the bit pattern output by the OR gates 213, and (F) indicates the output signal of the AND gate 214.

In the example of the detection of servo sync marks shown in FIG. 6, it is assumed that the comparison bit pattern stored in the SMR 202 is "1011001" as indicated by (A), and that the detection bit pattern stored in the DBSR 201 is "1011011" as indicated by (C).

As described earlier, when the single-bit match between the detection bit pattern and the comparison bit pattern occurs, the corresponding one of the NOT-EXOR gates 211 outputs a high-level signal ("1"). On the other hand, when the single-bit match between the detection bit pattern and the comparison bit pattern does not occur, the corresponding one of the NOT-EXOR gates 211 outputs a low-level signal ("0"). It is immediately apparent from the comparison of the detection bit pattern "1011011" and the comparison bit pattern "1011001" that the mismatch occurs only at the second LSB position and the match occurs at the other bit positions. Hence, in the example of FIG. 6, the bit pattern output by the NOT-EXOR gates 211 is "1111101" as indicated by (D).

In the example of FIG. 6, the tolerance bit pattern stored in the TBR 212 is "0000010" as indicated by (B). Namely, in the tolerance bit pattern for this case, only the bit at the second LSB position is set to "1" (the mismatch is permitted), and the other bits of the tolerance bit pattern for this case are set to "0" (the mismatch is not permitted). From the tolerance bit pattern for this case, it is apparent that the mismatch is permitted only at the second LSB position of the bit pattern, but the mismatch at the other bit positions of the bit pattern is not permitted. Therefore, in the example of FIG. 6, the bit pattern output by the OR gates 213 is "1111111" as indicated by (E).

As described above, the AND gate 214 outputs a result of the AND logic based on the plurality of the input bits (or the bit pattern output by the OR gates 213). If the presence of the servo sync mark in the detection bit pattern is detected, the AND gate 214 outputs a high-level signal ("1"). If the absence of the servo sync mark in the detection bit pattern is detected, the AND gate 214 outputs a low-level signal ("0"). Hence, in the example of FIG. 6, the signal output by the AND gate 214 is "1" as indicated by (F). Namely, the presence of the servo sync mark in the detection bit pattern is detected for this case.

Further, in the tolerance bit pattern for this case, the bits of the tolerance bit pattern, other than at the second LSB position thereof, are set to "0" (the mismatch is not permitted) as indicated by (B) in FIG. 6. If the mismatch between the detection bit pattern and the comparison bit pattern occurs at any of these bits of the tolerance bit pattern, then the signal output by the AND gate 214 is "0". Namely, the absence of the servo sync mark in the detection bit pattern is detected in such a case.

Accordingly, the servo information detection method and the disk apparatus of the above-described embodiment are effective in accurately and reliably detecting the servo information in the disk without being influenced by an insignificant defect on the disk. Even if a medium defect of the size of 1 bit or more is included in the detection bit pattern, the presence of the servo sync mark therein can be detected reliably. No indication of a defective sector is generated in such a case. It is possible to prevent the reduction of the amount of storage available to the disk due to the defective sector or the like.

Next, a description will be given of a method of determination of a tolerance bit pattern that is set in the tolerance bit register (TBR) 212, with reference to FIG. 7 and FIG. 8.

Figure 7:
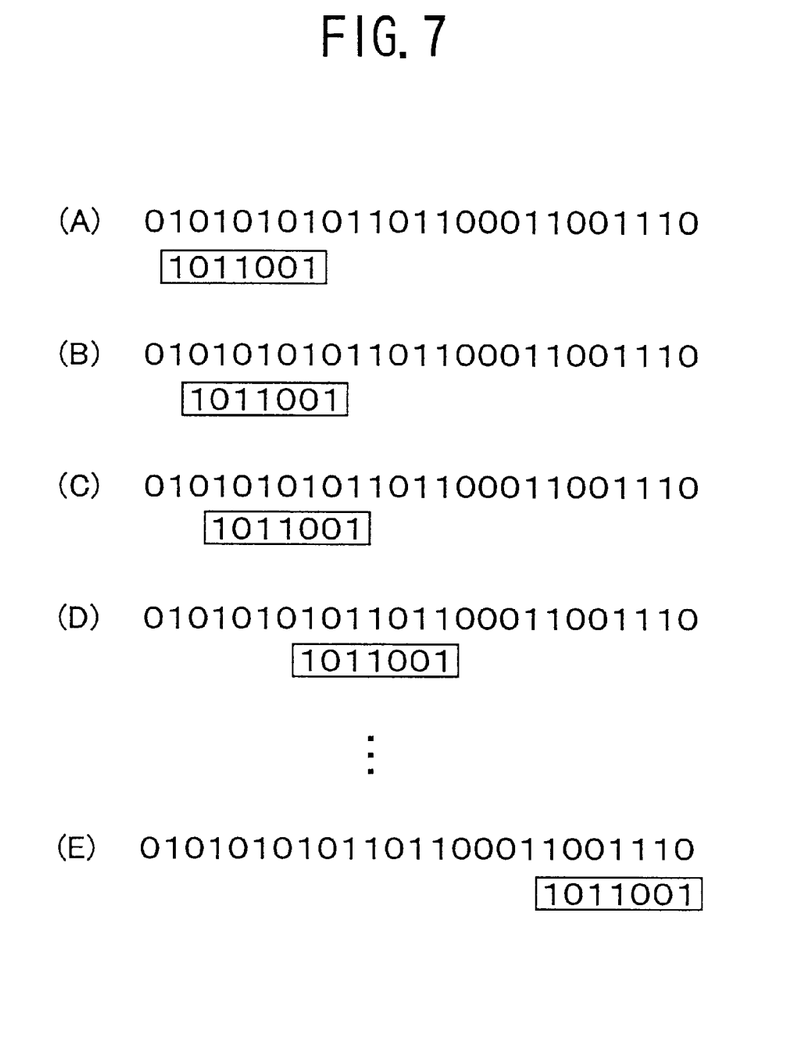
FIG. 7 is a diagram for explaining determination of tolerance bits that is performed by one preferred embodiment of the disk apparatus of the invention.

FIG. 7 is a diagram for explaining determination of tolerance bits that is performed by one preferred embodiment of the disk apparatus of the invention.

In the present embodiment, the detection of the servo information in the disk is executed by the MPU 124 of the disk apparatus 100 (FIG. 2) in accordance with a program recorded, in advance, in the ROM 123.

In order to determine the tolerance bit pattern that is set in the TBR 212, the MPU 124 of the disk apparatus of the present embodiment performs the following steps.

First, the MPU 124 executes the detection of the servo sync marks for all of the sectors of the disk 111. In this step, when all of the bits in the detection bit pattern match with the bits in the comparison bit pattern, it is determined that the presence of the servo sync mark in the detection bit pattern is detected. In other words, the servo sync mark detection executed in the first step is essentially the same as the detection method of the conventional disk apparatus.

Second, the MPU 124 stores all of the error locations (the respective cylinder numbers and the respective sector numbers) of the disk at which the indication of an error of the servo sync mark detection is generated as a result of the servo sync mark detection in the first step.

Third, the MPU 124 selects one of the error locations of the disk sequentially. In other words, the specific cylinder number and the specific sector number of the disk for one of the error locations are read from the stored error locations. For the selected error location, the MPU 124 sets a portion of the sequence of the detected servo sync mark bits in the vicinity of the selected error location, into the DBSR 201.

Fourth, the MPU 124 determines whether the detection bit pattern stored in the DBSR 201 matches with the comparison bit pattern ("1011001") stored in the SMR 202, every time the detection bit pattern of the DBSR 201 is shifted by one bit over the sequence of the detected servo sync mark bits as indicated by (A) through (E) in FIG. 7. For each of such comparisons, the MPU 124 detects the number of mismatch bits in the detection bit pattern at which the mismatch between the detection bit pattern and the comparison bit pattern occurs.

Fifth, as the result of the comparisons for all of the shifted locations, the MPU 124 determines that the portion of the sequence of the detected servo sync mark bits having the smallest number of mismatch bits among those detected numbers is a servo sync mark. In the example of FIG. 7, the portion of the detected servo sync mark bit sequence, indicated by (D) in FIG. 7, has the smallest number of mismatch bits (which is equal to one in the example of FIG. 7), and the MPU 124 determines the portion indicated by (D) in FIG. 7 as being a servo sync mark.

Sixth, with respect to the bit pattern determined in the fifth step, the MPU 124 detects the positions of the mismatch bits in the determined bit pattern at which the mismatch between the detection bit pattern and the comparison bit pattern occurs. Then, the MPU 124 determines a tolerance bit pattern that is set in the TBR 212. Specifically, the tolerance bit pattern is determined by setting the bits of the tolerance bit pattern at the positions of the mismatch bits to "1" and setting the bits of the tolerance bit pattern at the other positions to "0". The MPU 124 stores the resulting tolerance bit pattern which is associated with the selected error location of the disk.

Finally, the MPU 124 repeats the third through sixth steps for all of the error locations of the disk in order to determine respective tolerance bit patterns which are associated with the error locations of the disk. The MPU 124 stores a correspondence list indicating the correspondences of the tolerance bit patterns and the error locations of the disk. Further, the MPU 124 sorts the list of the tolerance bit patterns according to the cylinder number and the sector number of each error location of the disk. The MPU 124 stores the sorted tolerance bit pattern list.

According to the disk apparatus of the above-described embodiment, the MPU 124 sets a corresponding one of the tolerance bit patterns of the stored list into the tolerance bit register 212 according to the cylinder number and the sector number of the detected error location of the disk. As described above, it is determined that the detected servo sync mark bits have the smallest number of mismatch bits, and the tolerance bit pattern, stored in the TBR 212, is optimum for performing the detection of the servo sync mark at the error location of the disk.

In the above-described embodiment, the MPU 124 compares the detection bit pattern stored in the DBSR 201 with the comparison bit pattern stored in the SMR 202, and determines that the portion of the sequence of the detected servo sync mark bits having the smallest number of mismatch bits is a servo sync mark SM. Alternatively, the MPU 124 may compare an extended detection bit pattern with a comparison bit pattern combining a front-end pattern, a tail-end pattern, and a servo sync mark pattern, for the purpose of determining a servo sync mark SM.

Figure 8:
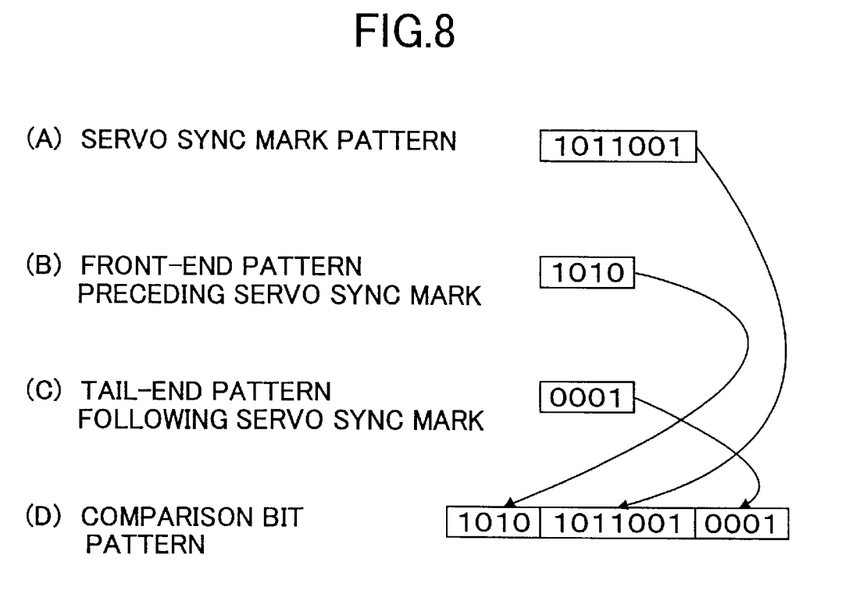
FIG. 8 is a diagram for explaining determination of tolerance bits that is performed by an alternative embodiment of the disk apparatus of the invention.

FIG. 8 is a diagram for explaining determination of tolerance bits that is performed by an alternative embodiment of the disk apparatus of the invention.

In FIG. 8, (A) indicates a servo sync mark pattern, (B) indicates a front-end pattern preceding the servo sync mark pattern, (C) indicates a tail-end pattern following the servo sync mark pattern, (D) indicates a comparison bit pattern combining the three patterns: the servo sync mark pattern, the front-end pattern, and the tail-end pattern.

Similar to the previous embodiment of FIG. 7, in the present embodiment, the detection of the servo information in the disk is executed by the MPU 124 of the disk apparatus 100 (FIG. 2) in accordance with a program recorded, in advance, in the ROM 123.

In order to determine the tolerance bit pattern that is set in the TBR 212, the MPU 124 of the disk apparatus of the present embodiment performs the steps that are similar to those in the previous embodiment of FIG. 7. By the use of the comparison bit pattern indicated by (D) in FIG. 8, the disk apparatus of the present embodiment provides increased accuracy of the determination of the tolerance bit pattern.

In the disk apparatus and the servo information detection method according to the present invention, after the presence of the servo sync mark SM in the detection bit pattern is detected in the above-described manner, the accuracy of the servo sync mark detection is verified additionally.

Next, a description will be given of a method of verification of the accuracy of the servo sync mark detection that is performed by one preferred embodiment of the disk apparatus of the present invention.

Suppose that the MPU 124 in the disk apparatus of the present embodiment includes a first register and a second register, both being capable of storing a set of bits of data. Further, suppose that the list of the error locations of the disk and the list of the tolerance bit patterns sorted according to the cylinder number and the sector number of each error location are already stored in the MPU 124 as in the previous embodiment of FIG. 7.

In order to verify the accuracy of the servo sync mark detection, the MPU 124 of the disk apparatus of the present embodiment performs the following steps.

First, the MPU 124 reads, from the stored list, the cylinder number and the sector number that indicate a selected error location of the disk corresponding to one of the tolerance bit patterns of the stored list.

Second, the MPU 124 reads, from the sector of the disk indicated by the selected error location, a gray code at the disk location following the location of the detection bit pattern where the presence of the servo sync mark SM is detected. The MPU 124 sets the read gray code into the first register.

A pattern of gray codes recorded in a cylinder of the disk contains information of the cylinder number, and the gray codes recorded in all of the sectors of the same cylinder are the same even if the sector number is different. Thus, if the gray code is read from a certain cylinder of the disk, it is possible to correctly detect the cylinder number from the read gray code.

Third, the MPU 124 reads a gray code from another sector in the same cylinder of the disk which is indicated by the selected error location and contains a servo sync mark SM that can be detected. The MPU 124 sets the read gray code into the second register.

Fourth, the MPU 124 determines whether the gray code stored in the first register matches with the gray code stored in the second register. As a result of such comparison, the MPU 124 verifies that the detection of the servo sync mark SM at the selected error location of the disk has been correctly performed by using the tolerance bit pattern. Namely, when the match between the gray code in the first register and the gray code in the second register occurs, the MPU 124 verifies that the detection of the servo sync mark SM, which has been performed at the selected error location of the disk by using the tolerance bit pattern, is correct. On the other hand, when the mismatch between the gray code in the first register and the gray code in the second register occurs, the MPU 124 determines that the detection of the servo sync mark SM, which has been performed at the selected location of the disk by using the tolerance bit pattern, is incorrect.

The above-mentioned steps are repeated for all of the error locations of the stored list corresponding to the tolerance bit patterns of the stored list. The MPU 124 verifies the accuracy of the detection of the servo sync mark SM, which has been performed at each of the error locations of the disk by using the corresponding one of the tolerance bit patterns in the stored list. Hence, the MPU 124 of the present embodiment verifies the accuracy of the servo sync mark detection which has been performed by using the corresponding tolerance bit pattern for each of the error locations of the disk as in the stored list.

After the above verification is performed, the MPU 124 stores the list of the tolerance bit patterns including only those with the accuracy of the detection being verified. When performing the detection of the servo sync mark SM at one of the error locations of the disk, the MPU 124 sets the corresponding one of the tolerance bit patterns of the stored list into the TBR 212. With the disk apparatus 100 being set in the above conditions, the SMDP 200 of the embodiment of FIG. 5 carries out the servo information detection for the selected error location of the disk by using the tolerance bit pattern stored in the TBR 212. When performing the detection of the servo sync mark SM at the sector of the disk that requires no tolerance bit pattern, the MPU 124 sets the "0" bit pattern ("000000") into the TBR 212. In such a case, the SMDP 200 of the embodiment of FIG. 5 carries out the servo information detection in the same manner as in the conventional disk apparatus.

According to the above-described embodiment, the servo information detection method and the disk apparatus are effective in accurately and reliably detecting the servo information in the disk without being influenced by an insignificant defect on the disk. Even if a medium defect of the size of 1 bit or more is included in the detection bit pattern, the presence of the servo sync mark therein can be reliably detected without causing an error. It is possible to prevent the reduction of the amount of storage available to the disk due to the defective sector or the like. Further, by the use of the tolerance bit pattern, the matching of the detection bit pattern and the comparison bit pattern is performed only at the bits of the tolerance bit pattern wherein the mismatch is not permitted, and it is possible to reduce the number of erroneous servo sync mark detections. Further, the servo sync mark determination processing unit 200 in the disk apparatus of the above embodiment can be configured with a simple structure.

The present invention is not limited to the above-described embodiments, and variations and modifications may be made without departing from the scope of the present invention.

Further, the present invention is based on Japanese priority application No.2001-037648, filed on Feb. 14, 2001, the entire contents of which are hereby incorporated by reference.

What is claimed is:

1. A servo information detection method for detecting a servo sync mark of a disk, comprising the steps of:
   determining whether a pattern of detection bits, detected from a vicinity of the servo sync mark of the disk, matches with a given comparison bit pattern; and
   changing a pattern of tolerance bits based on a location of the disk where the servo sync mark is detected, so that the matching between the detection bit pattern and the comparison bit pattern is performed based on the changed tolerance bit pattern.

2. The servo information detection method of claim 1, wherein the presence of the servo sync mark in the detection bit pattern is determined when the detection bit pattern includes a smallest number of mismatch bits after the number of mismatch bits in the detection bit pattern, obtained as a result of the matching, is repeatedly detected every time the detection bit pattern is shifted by one bit over a sequence of the detected servo sync mark bits.

3. The servo information detection method of claim 1, wherein the determination as to the presence of the servo sync mark in the detection bit pattern does not depend on a result of the matching between the detection bit pattern and the comparison bit pattern with respect to bits of the detection bit pattern corresponding to bits of the tolerance bit pattern indicating that the mismatch is permitted.

4. The servo information detection method of claim 1, wherein the detection bit pattern is extracted from a portion of a sequence of the detected servo sync mark bits, and, in said determining step, the presence of the servo sync mark in the detection bit pattern is determined depending on a result of the matching between the detection bit pattern and the comparison bit pattern.

5. The servo information detection method of claim 1, wherein the determination as to the presence of the servo sync mark in the detection bit pattern depends solely on a result of the matching between the detection bit pattern and the comparison bit pattern with respect to bits of the detection bit pattern corresponding to bits of the tolerance bit pattern indicating that the mismatch is not permitted.

6. The servo information detection method of claim 1, wherein error locations of the disk are detected by execution of a servo sync mark detection for all of sectors of the disk, and respective tolerance bit patterns associated with the error locations of the disk are determined, and a list indicating correspondences between the tolerance bit patterns and the error locations of the disk is stored.

7. The servo information detection method of claim 1, wherein an extended detection bit pattern, extracted from a portion of a sequence of the detected servo sync mark bits, is compared with a combined comparison bit pattern including a front-end pattern and a tail-end pattern, so that the presence of the servo sync mark in the extended detection bit pattern is determined.

8. The servo information detection method of claim 1, further comprising the step of verifying that the detection of the servo sync mark at a selected location of the disk has been correctly performed by using the tolerance bit pattern.

9. The servo information detection method of claim 6, wherein, when performing the detection of the servo sync mark at a selected error location of the disk, a corresponding one of the tolerance bit patterns is read from the stored list, and the determination as to the presence of the servo sync mark in the detection bit pattern for the selected error location of the disk is performed by using the read tolerance bit pattern.

10. A disk apparatus in which a servo sync mark of a disk is detected, the disk apparatus comprising:

a determination unit determining whether a pattern of detection bits, detected from a vicinity of the servo sync mark of the disk, matches with a given comparison bit pattern; and a control unit changing a pattern of tolerance bits based on a location of the disk where the servo sync mark is detected, so that the determination unit is allowed to perform the matching between the detection bit pattern and the comparison bit pattern based on the changed tolerance bit pattern.

11. The disk apparatus of claim 10, wherein the determination unit determines the presence of the servo sync mark in the detection bit pattern when the detection bit pattern includes a smallest number of mismatch bits after the number of mismatch bits in the detection bit pattern, obtained as a result of the matching, is repeatedly detected every time the detection bit pattern is shifted by one bit over a sequence of the detected servo sync mark bits.

12. The disk apparatus of claim 10, wherein the determination as to the presence of the servo sync mark in the detection bit pattern does not depend on a result of the matching between the detection bit pattern and the comparison bit pattern with respect to bits of the detection bit pattern corresponding to bits of the tolerance bit pattern indicating that the mismatch is permitted.

13. The disk apparatus of claim 10, wherein the detection bit pattern is extracted from a portion of a sequence of the detected servo sync mark bits, and the determination unit determines the presence of the servo sync mark in the detection bit pattern depending on a result of the matching between the detection bit pattern and the comparison bit pattern.

14. The disk apparatus of claim 10, wherein the determination as to the presence of the servo sync mark in the detection bit pattern depends solely on a result of the matching between the detection bit pattern and the comparison bit pattern with respect to bits of the detection bit pattern corresponding to bits of the tolerance bit pattern indicating that the mismatch is not permitted.

15. The disk apparatus of claim 10, wherein the control unit detects error locations of the disk by execution of a servo sync mark detection for all of sectors of the disk, determines respective tolerance bit patterns associated with the error locations of the disk, and stores a list indicating correspondences between the tolerance bit patterns and the error locations of the disk.

16. The disk apparatus of claim 10, wherein the determination unit is configured to compare an extended detection bit pattern, extracted from a portion of a sequence of the detected servo sync mark bits, with a combined comparison bit pattern including a front-end pattern and a tail-end pattern, so that the presence of the servo sync mark in the extended detection bit pattern is determined.

17. The disk apparatus of claim 10, wherein the control unit comprises a verification unit verifying that the detection of the servo sync mark at a selected location of the disk has been correctly performed by using the tolerance bit pattern.

18. The disk apparatus of claim 15, wherein, when performing the detection of the servo sync mark at a selected error location of the disk, the control unit reads a corresponding one of the tolerance bit patterns from the stored list, and the determination unit is allowed to perform the determination as to the presence of the servo sync mark in the detection bit pattern for the selected error location of the disk by using the read tolerance bit pattern.

* * * * *